(12) United States Patent
Kim

(10) Patent No.: US 11,630,477 B2
(45) Date of Patent: Apr. 18, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/699,937

(22) Filed: Mar. 21, 2022

(65) Prior Publication Data

US 2023/0023040 A1    Jan. 26, 2023

(30) Foreign Application Priority Data

Jul. 26, 2021   (KR) .................. 10-2021-0097981

(51) Int. Cl.
| | |
|---|---|
| *G05G 1/30* | (2008.04) |
| *G05G 1/40* | (2008.04) |
| *B60K 26/02* | (2006.01) |
| *B60T 7/04* | (2006.01) |
| *G05G 1/38* | (2008.04) |
| *G05G 5/05* | (2006.01) |

(52) U.S. Cl.
CPC .............. *G05G 1/40* (2013.01); *B60K 26/02* (2013.01); *B60T 7/042* (2013.01); *G05G 1/38* (2013.01); *G05G 5/05* (2013.01); *B60K 2026/026* (2013.01); *G05G 2505/00* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 5/005; G05G 5/05; B60R 21/09; B60T 7/04; B60T 7/06; B60T 7/042; B60K 26/02; B60K 26/021; B60K 2026/021; B60K 2026/024; B60K 2026/026
See application file for complete search history.

(56) References Cited

U.S. PATENT DOCUMENTS

| | | | |
|---|---|---|---|
| 6,182,525 B1 * | 2/2001 | Bowers .................. | B60K 23/02 180/274 |
| 7,066,048 B2 * | 6/2006 | Sauvonnet ............. | G05G 1/405 74/512 |

(Continued)

FOREIGN PATENT DOCUMENTS

| | | | |
|---|---|---|---|
| KR | 2017-0137427 A | | 12/2017 |
| WO | WO-2021182563 A1 * | | 9/2021 |

OTHER PUBLICATIONS

Machine Translation of WO 2021/182563.*

*Primary Examiner* — Brian J McGovern
(74) *Attorney, Agent, or Firm* — Fox Rothschild LLP

(57) ABSTRACT

A foldable pedal apparatus for a vehicle includes pedal assemblies including pedal arms and pedal pads that are rotated rearwards and are thus popped up to a driver so as to be operated by the driver in a manual driving mode in which the driver directly drives a vehicle. Also, the pedal assemblies including the pedal arms and the pedal pads may be rotated forwards and upwards, so as to be located close to a front surface of a footrest panel and thus enter a hidden state in which exposure of the pedal assemblies to the driver is interrupted so as not to be operated by the driver in an autonomous driving situation.

17 Claims, 11 Drawing Sheets

(56) References Cited

U.S. PATENT DOCUMENTS

| | | | |
|---|---|---|---|
| 10,906,514 B1* | 2/2021 | Kim | G05G 5/03 |
| 10,946,741 B1* | 3/2021 | Kim | B60T 7/06 |
| 10,994,611 B1* | 5/2021 | Kim | G05G 5/28 |
| 11,021,058 B1* | 6/2021 | Kim | G05G 5/28 |
| 11,225,226 B1* | 1/2022 | Kim | B60T 7/042 |
| 11,249,506 B1* | 2/2022 | Kim | G05G 5/28 |
| 11,312,236 B1* | 4/2022 | Kim | B60T 7/065 |
| 11,327,520 B1* | 5/2022 | Kim | G05G 5/05 |
| 2005/0011493 A1* | 1/2005 | Reimann | B60K 26/021 74/513 |
| 2009/0223319 A1* | 9/2009 | Choi | G05G 1/36 74/512 |
| 2015/0107402 A1* | 4/2015 | Leem | G05G 5/03 74/512 |
| 2017/0225570 A1* | 8/2017 | El Aile | B60R 21/203 |
| 2019/0310678 A1* | 10/2019 | Wojciechowski | B60K 26/021 |
| 2020/0317167 A1* | 10/2020 | Ghaffari | B60T 7/06 |
| 2021/0004040 A1* | 1/2021 | Dohmen | G05G 1/42 |
| 2021/0170988 A1* | 6/2021 | Villalva Sanchez | B60R 21/09 |
| 2021/0284106 A1* | 9/2021 | Kim | B60T 7/06 |
| 2021/0331584 A1* | 10/2021 | Kim | G05G 1/40 |
| 2021/0394798 A1* | 12/2021 | Kim | B60T 7/12 |
| 2022/0001843 A1* | 1/2022 | Michael | G05G 1/60 |
| 2022/0011806 A1* | 1/2022 | Miletto | B60K 23/02 |
| 2022/0048384 A1* | 2/2022 | Kim | G05G 5/28 |
| 2022/0055477 A1* | 2/2022 | Kim | G05G 1/44 |

* cited by examiner

FOLDABLE PEDAL APPARATUS FOR VEHICLE

CROSS-REFERENCE TO RELATED APPLICATION

This application claims under 35 U.S.C. § 119(a) the benefit of Korean Patent Application No. 10-2021-0097981, filed on Jul. 26, 2021 in the Korean Intellectual Property Office, the entire contents of which are incorporated herein by reference.

BACKGROUND

1. Technical Field

The present disclosure relates to a foldable pedal apparatus for a vehicle, more particularly, to the foldable pedal apparatus in which pedal pads protrude toward a driver to be exposed to the driver so as to be operated by the driver in a manual driving mode in which the driver directly drives a vehicle, and the pedal pads are hidden so as not to be exposed to the driver and thus not to be operated by the driver in an autonomous driving situation.

2. Description of the Related Art

An autonomous vehicle is a smart vehicle that incorporates autonomous driving technology allowing a vehicle to autonomously reach a destination without a driver's direct operation of a steering wheel, an accelerator pedal, a brake, etc., and development of autonomous vehicles is rapidly progressing.

In general, if an autonomous driving situation is universally implemented, one is selected from among a manual driving mode in which a driver directly drives a vehicle and an autonomous driving mode in which the vehicle autonomously reaches a destination without driver's direct driving of the vehicle.

In the autonomous driving mode, the driver may comfortably rest while stretching out his or her legs, and thus, when pedals (i.e., an accelerator pedal and a brake pedal) located in a space under a driver's seat remain exposed to an interior of the vehicle, these pedals may obstruct or disturb the driver.

Further, the autonomous driving situation indicates a situation in which the driver does not operate the pedals (i.e., the accelerator pedal and the brake pedal) of the vehicle, and thus, when the driver operates the pedals during autonomous driving, a vehicle controller terminates autonomous driving, determines the situation as one in which the driver wants to directly drive the vehicle, and thus terminates control for autonomous driving.

However, if the pedals of the vehicle are installed so as to be exposed to the space under the driver's seat, there is a possibility that the driver would unconsciously operate the pedals in the autonomous driving situation (i.e., erroneous operation of the pedals), and in this case, an accident may occur depending on a road condition, a distance between vehicles, or the like.

Therefore, it would be desirable to develop technology related to a pedal apparatus in which pedal pads protrude towards a driver to be exposed to the driver so as to be operated by the driver in the manual driving mode, and the pedal pads are hidden so as not to be exposed to the driver and thus not operated by the driver in the autonomous driving situation in order to prevent erroneous operation of the pedal pads.

The above information disclosed in the Background section is only for enhancement of understanding of the background of the disclosure and should not be interpreted as conventional technology that is already known to those skilled in the art.

SUMMARY

Therefore, the present disclosure provides a foldable pedal apparatus for a vehicle in which pedal pads protrude towards a driver and are thus exposed (popped up) to the driver to be operated by the driver in a manual driving mode in which a driver directly drives a vehicle, and the pedal pads are hidden (shielded) and are thus not exposed to the driver so as not to be operated by the driver in an autonomous driving situation, thus enabling the driver to comfortably rest in the autonomous driving situation and to promote safety through interruption of erroneous operation of pedals in the autonomous driving situation.

It is another object of the present disclosure to provide a foldable pedal apparatus in which pedal pads in a hidden state are not exposed to the interior of a vehicle so as to improve the interior design of the vehicle, and in a pop-up operation, the pedal pads protrude and are popped up so as to maximize a high-tech image.

It is yet another object of the present disclosure to provide a foldable pedal apparatus in which a space configured to hide pedal assemblies in the hidden state thereof may be minimized, and thereby, the space of the interior of a vehicle and the space of an engine compartment may be assured.

In accordance with the present disclosure, the above and other objects can be accomplished by the provision of a foldable pedal apparatus, including pedal assemblies rotated towards a front surface of a footrest panel to enter a hidden state, in which the pedal assemblies are nonmanipulable by a driver, in an autonomous driving situation, and rotated rearwards to enter a pop-up state, in which the pedal assemblies are exposed to the driver so as to be manipulable by the driver, in a manual driving mode, and actuators fixed to the footrest panel, respectively connected to the pedal assemblies and operated to rotate the pedal assemblies forwards and upwards, or rearwards.

Two pedal devices having the same configuration, each pedal device including one of the pedal assemblies and one of the actuators, may be installed on the footrest panel so as to be laterally spaced apart from each other.

One of the two pedal devices installed on the footrest panel so as to be laterally spaced apart from each other may be used as an accelerator pedal device, and a remaining one may be used as a brake pedal device.

Each of the pedal assemblies may include pedal arms connected to a corresponding one of the actuators and rotated during operation of the corresponding one of the actuators, a pedal pad combined with the pedal arms and rectilinearly moved in a length direction of the pedal arms when external force is applied thereto, and return springs installed with both ends supported by the pedal arms and the pedal pad so as to provide returning force to the pedal pad.

The pedal arms may include two pedal arms laterally spaced apart from each other, two connectors respectively combined with the two pedal arms may be provided on the pedal pad, connector holes configured to extend in a length direction may be formed in the connectors, and each of the return springs and one end of each of the pedal arms may be inserted into a corresponding one of the connector holes.

A pedal arm pin configured to protrude outwards may be provided at a rear end of each of the pedal arms, and a slot hole configured to extend in a length direction of the connectors may be formed in each of the connectors so that the pedal arm pin is inserted into the slot hole.

The pedal arms may be formed in an L shape so that a supported state of the pedal arms through surface contact between the pedal arms and the front surface of the footrest panel is maintained when the pedal assembles are rotated rearwards and are thus in the pop-up state.

The pedal pads may include a pedal pad of a pedal assembly of an accelerator pedal device and a pedal pad of a pedal assembly of a brake pedal device, the pedal pad of the pedal assembly of the accelerator pedal device may have a greater size in a vertical direction than that of the pedal pad of the pedal assembly of the brake pedal device, and the pedal pad of the pedal assembly of the brake pedal device may have a greater size in a lateral direction than that of the pedal pad of the pedal assembly of the accelerator pedal device.

The foldable pedal apparatus may further include permanent magnets combined with ends of the connectors, and pedal sensors combined with the pedal arms so as to face the permanent magnets, and each of the pedal sensors may detect a stroke change of a corresponding one of the pedal pads through a magnetic flux change depending on a position change of a corresponding one of the permanent magnets when the corresponding one of the pedal pads is rectilinearly moved.

Each of the permanent magnets and each of the pedal sensors may be provided at one of the two pedal arms and one of the two connectors of each of the pedal assemblies, or may be respectively provided at both of the two pedal arms and both of the two connectors of each of the pedal assemblies.

The actuators may be rotating motors fixedly installed on the front surface of the footrest panel, and the rotating motors may be dual shaft-type motors configured to be rotatable in both a clockwise direction and a counterclockwise direction and provided with at a motor shaft configured to protrude from both sides of each of the dual shaft-type motors.

The motor shaft configured to protrude from both sides of each of the rotating motors may be combined with front ends of the two pedal arms so that the two pedal arms are simultaneously rotated in the same direction when a corresponding one of the rotating motors is operated.

The foldable pedal apparatus may further include printed circuit boards (PCBs) fixed to the footrest panel, and each of the PCBs may control driving of a corresponding one of the rotating motors, may receive a signal from a corresponding one of the pedal sensors, and may generate a signal related to pedal functions.

When a position of one of the permanent magnets is changed due to forward movement of a corresponding one of the pedal pads by driver operation in a situation in which the rotating motors are not operated in the pop-up state, in which the pedal pads are exposed to the driver due to rearward movement of the pedal arms by operating the rotating motors, a corresponding one of the PCBs may generate the signal related to the pedal functions.

The foldable pedal apparatus may further include protective covers fixed to the footrest panel and configured to cover the rotating motors and the PCBs so as to protect the rotating motors and the PCBs.

Panel recesses configured to protrude forwards and to be open rearwards may be formed on the front surface of the footrest panel, the rotating motors and the PCBs may be installed to be inserted into the panel recesses, and the protective covers may be installed at an interior side of a vehicle so as to shield the panel recesses while covering the rotating motors and the PCBs.

When the pedal assemblies are in the hidden state, the pedal assemblies may be shielded by a center fascia under cover so as not to be exposed to the driver.

When the pedal assemblies in the hidden state are rotated rearwards and are thus converted into the pop-up state, the pedal assemblies may protrude through a passage formed under the center fascia under cover so as to be exposed to the driver.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
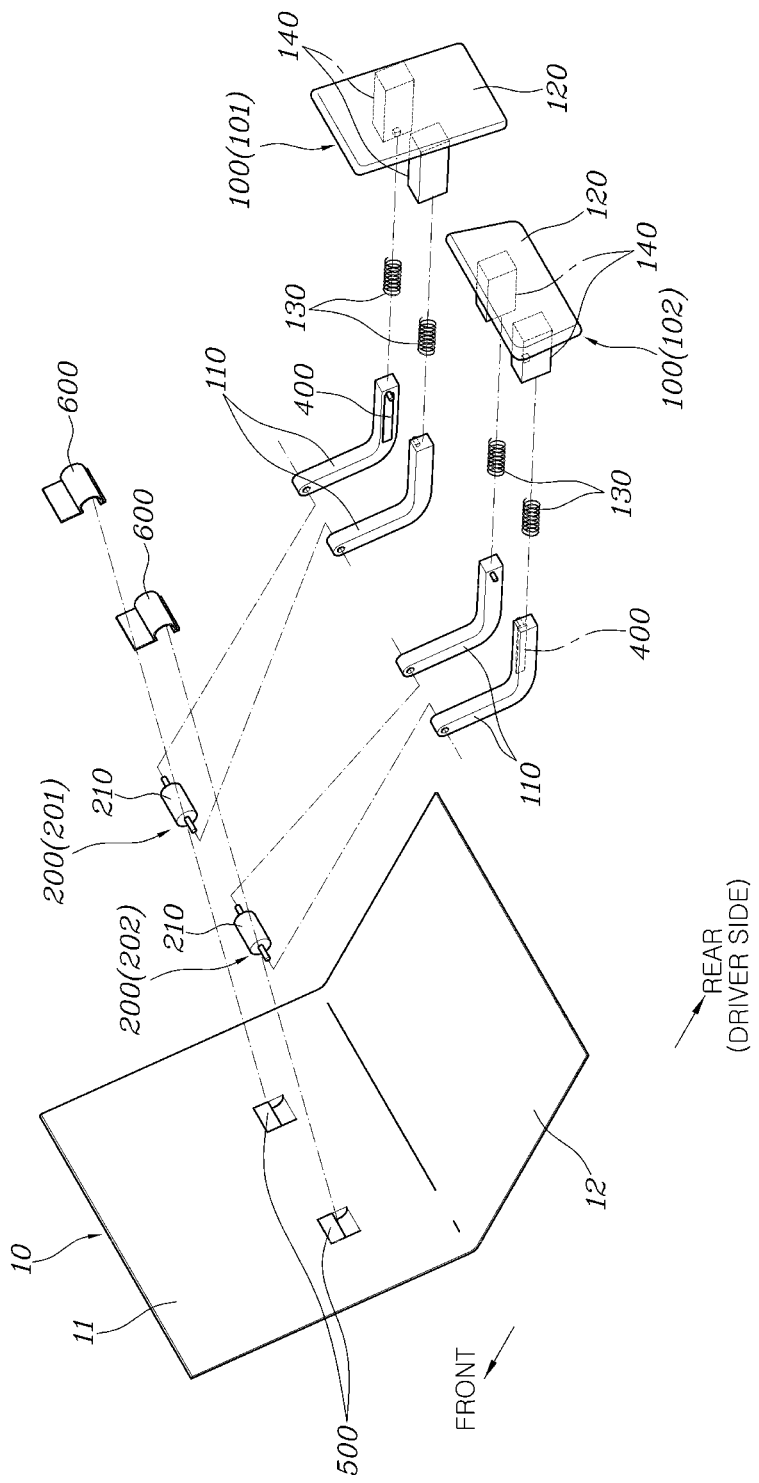
FIG. 1 is an exploded perspective view of a foldable pedal apparatus for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose the disclosure and cover modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

A control unit (controller) according to an exemplary embodiment of the present disclosure may be implemented through a non-volatile memory (not shown) configured to store an algorithm configured to control operations of various elements of the vehicle or data regarding software commands for reproducing the algorithm and a processor (not shown) configured to perform operations which will be described below using data stored in the corresponding memory. The memory and the processor may be implemented as individual chips. Alternatively, the memory and the processor may be implemented as a single integrated chip. Here, the processor may be provided in the form of one or more processors.

Hereinafter, a foldable pedal apparatus for a vehicle according to an exemplary embodiment of the present disclosure will be described with reference to the accompanying drawings.

A foldable pedal apparatus for a vehicle according to the present disclosure includes, as shown in FIGS. 1 to 11, pedal assemblies 100 rotated towards a front surface 11 of a footrest panel 10 to enter a hidden state, in which the pedal assemblies 100 are nonmanipulable by a driver, in an autonomous driving situation, and rotated rearwards to enter a pop-up state, in which the pedal assemblies 100 are exposed to the driver so as to be manipulable by the driver, in a manual driving mode, and actuators 200 fixed to the footrest panel 10, connected to the pedal assemblies 100 and operated to rotate the pedal assemblies 100 forwards and upwards, or rearwards.

The footrest panel 10 includes a bottom surface 12 pressed against the floor of a vehicle body, and the front surface 11 configured to extend forwards and upwards from the front end of the bottom surface 12 so as to be inclined.

Figure 7:
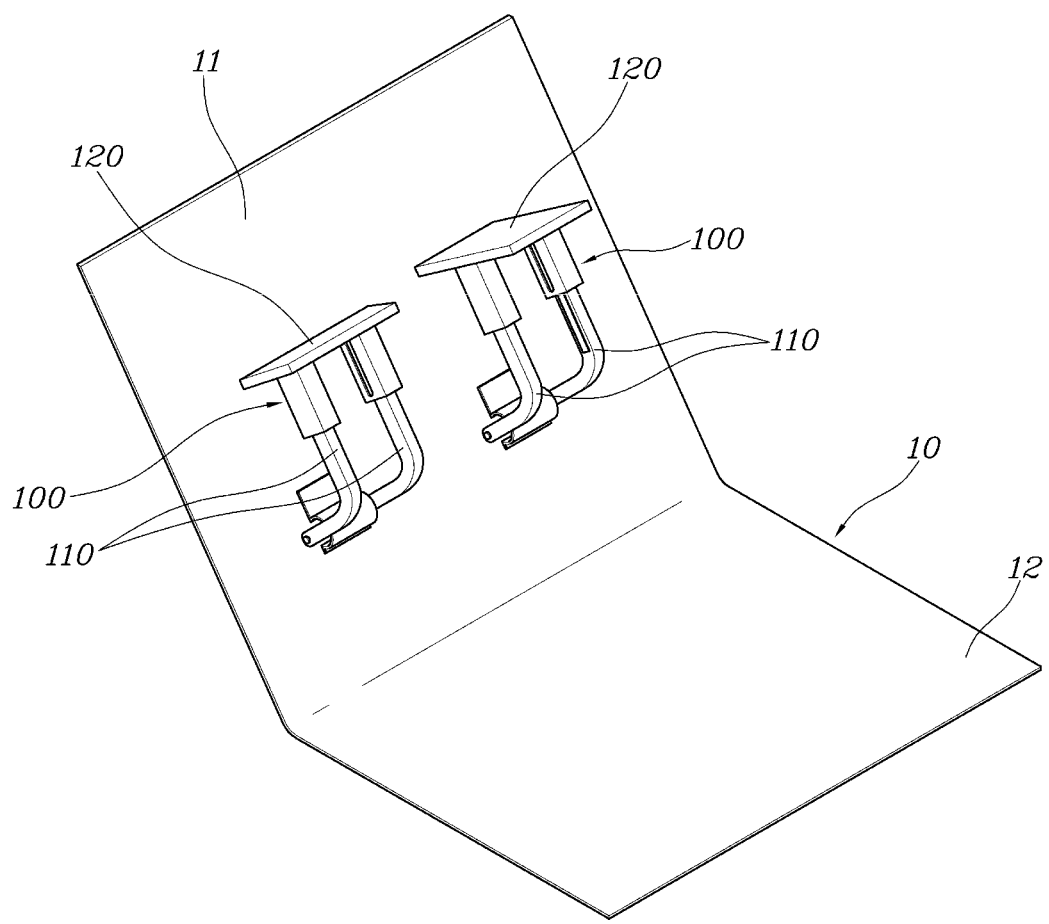
FIGS. 7 and 8 are views of the foldable pedal apparatus according to the present disclosure in the hidden state of the pedal assemblies.
Figure 8:
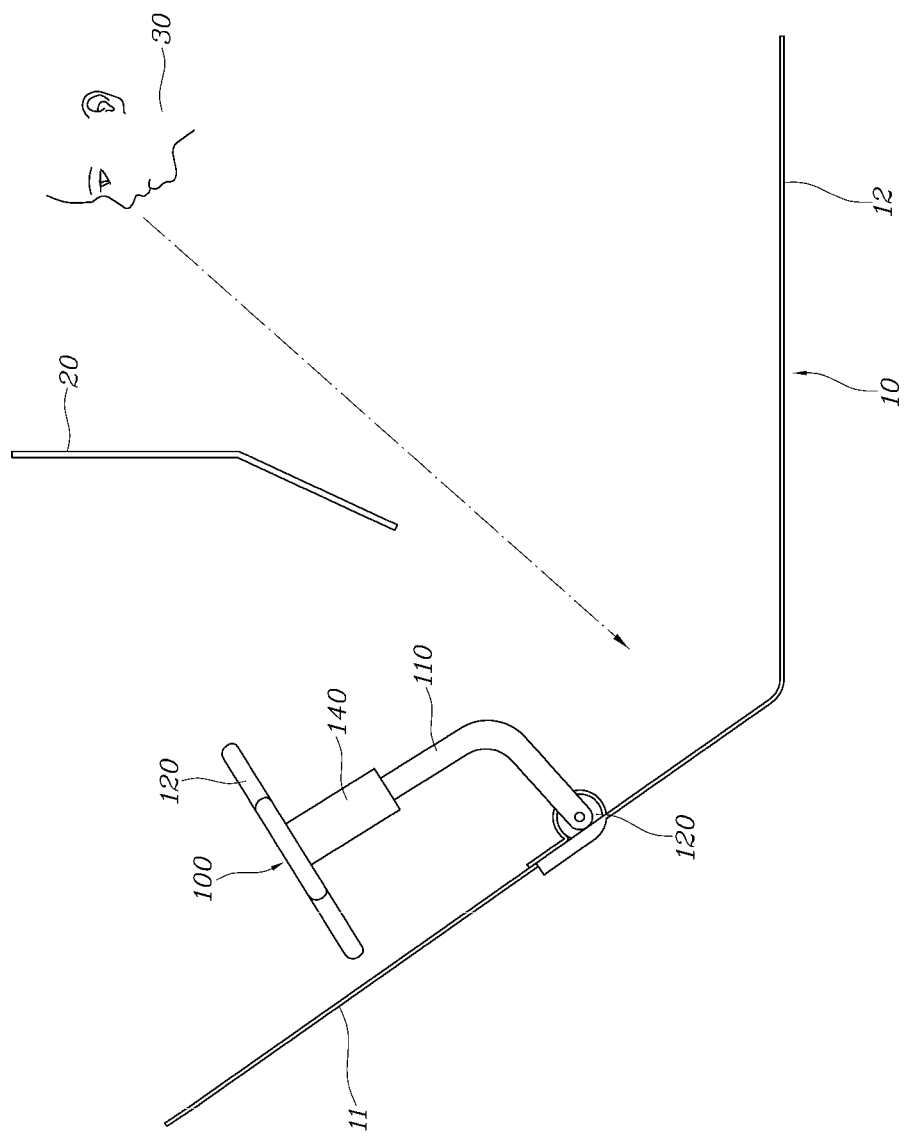

In the foldable pedal apparatus for a vehicle according to the present disclosure, when the pedal assemblies 100 are rotated forwards and upwards and are thus located maximally close to the front surface 11 of the footrest panel 10 by operating the actuators 200, exposure of the pedal assemblies 100 to the driver is interrupted and thus the pedal assemblies 100 maintain the hidden state, in which the pedal assemblies 100 are nonmanipulable by the driver (with reference to FIGS. 7 and 8).

When the pedal assemblies 100 are in the hidden state, the pedal assemblies 100 are shielded by a center fascia under cover 20 and are not exposed to driver's or passenger's view inside the vehicle, and thereby, the interior design of the vehicle may be improved.

Further, in the foldable pedal apparatus for a vehicle according to the present disclosure configured such that the pedal assemblies 100 are located in a space between the front surface 11 of the footrest panel 10 and the center fascia under cover 20 so as to be maintained in the hidden state, a space configured to hide the pedal assemblies 100 in the hidden state thereof may be minimized, and thereby, the space of the interior of the vehicle and the space of an engine compartment may be assured.

Figure 2:
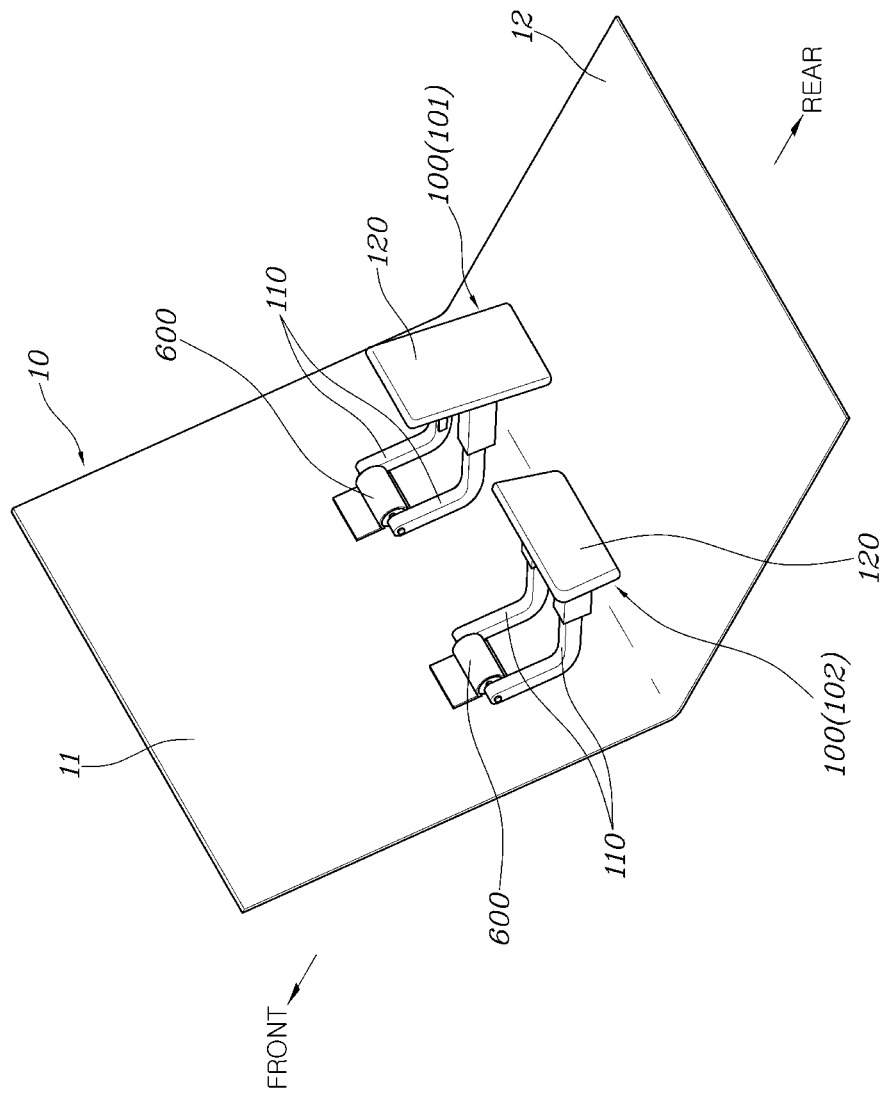
FIG. 2 is an assembled perspective view of the foldable pedal apparatus according to the present disclosure in the pop-up state of pedal assemblies.
Figure 3:
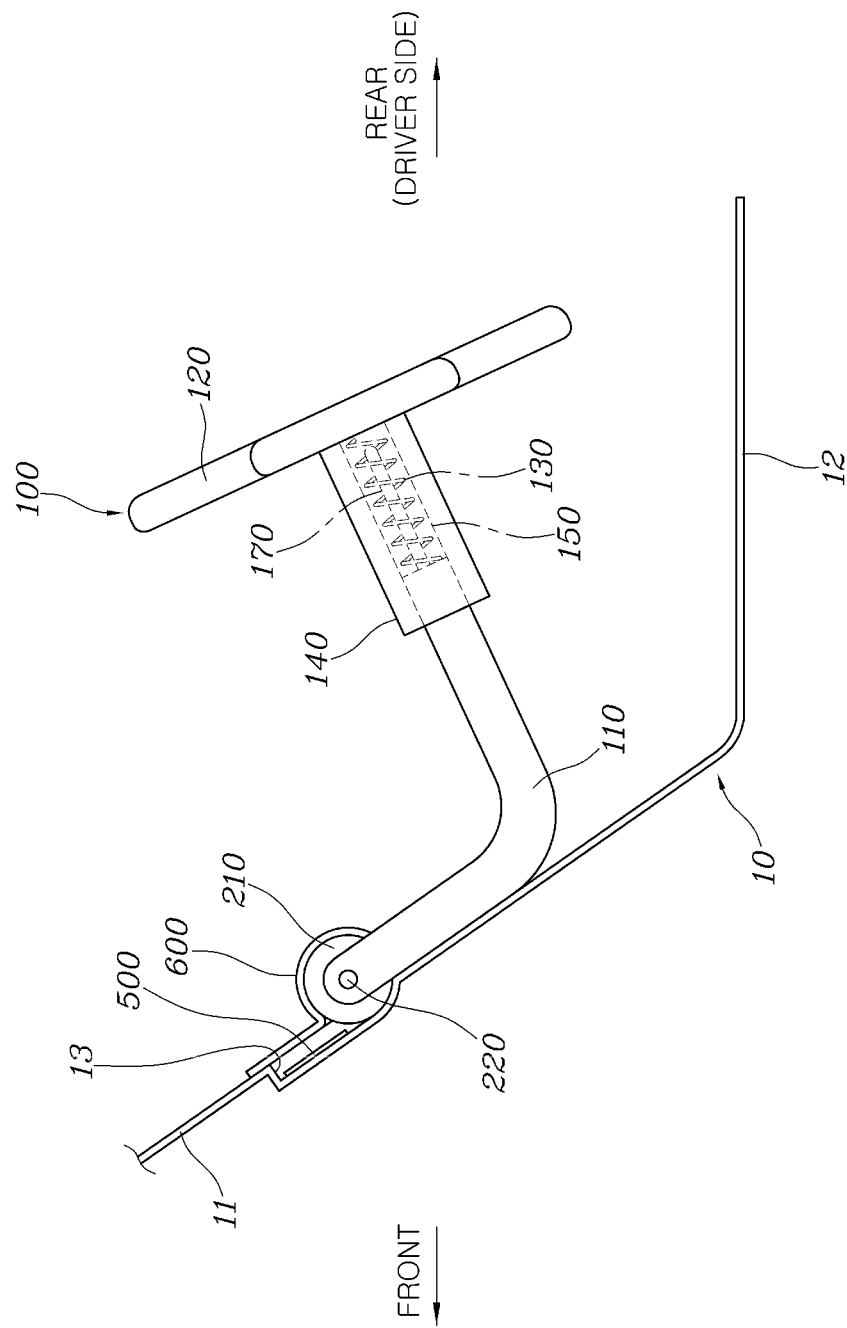
FIG. 3 is a side view of FIG. 2.
Figure 4:
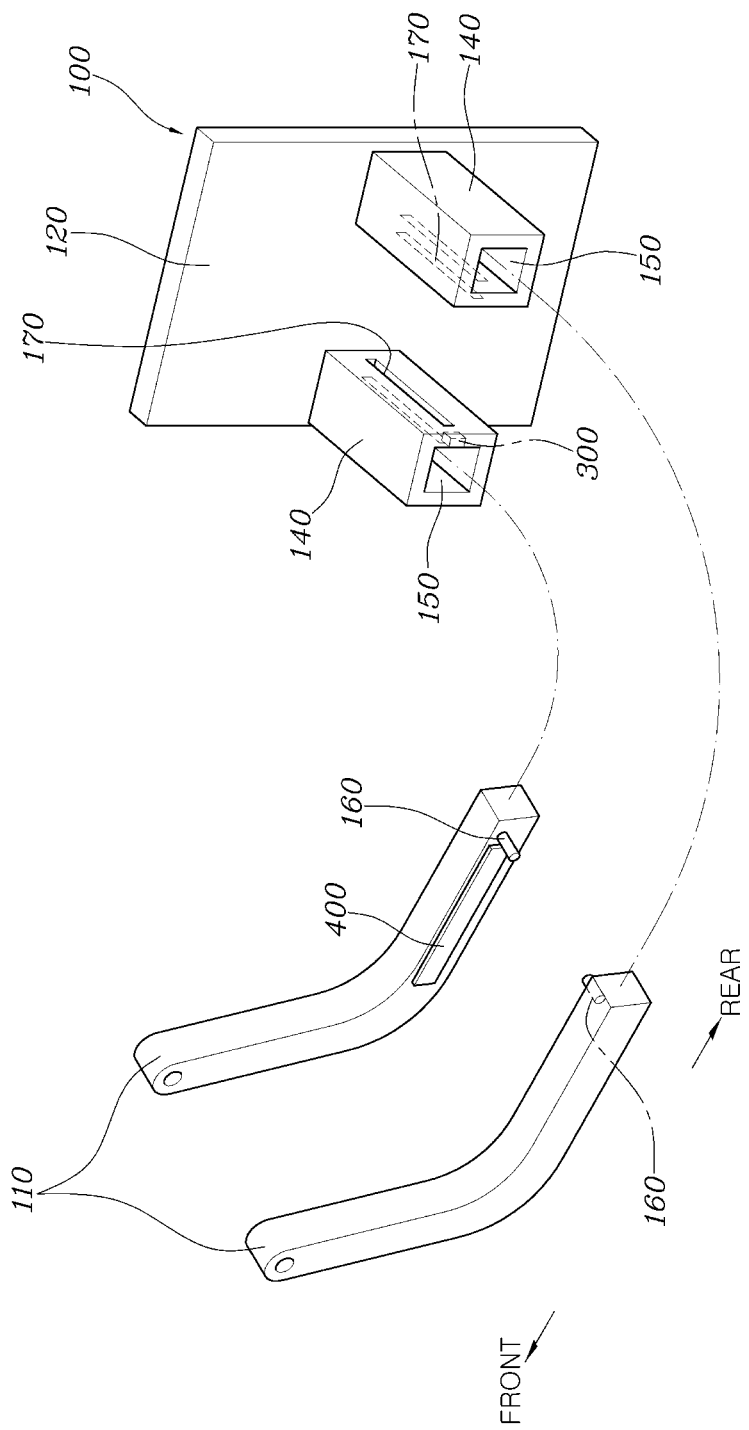
FIG. 4 is an exploded perspective view illustrating the pedal assembly.
Figure 5:
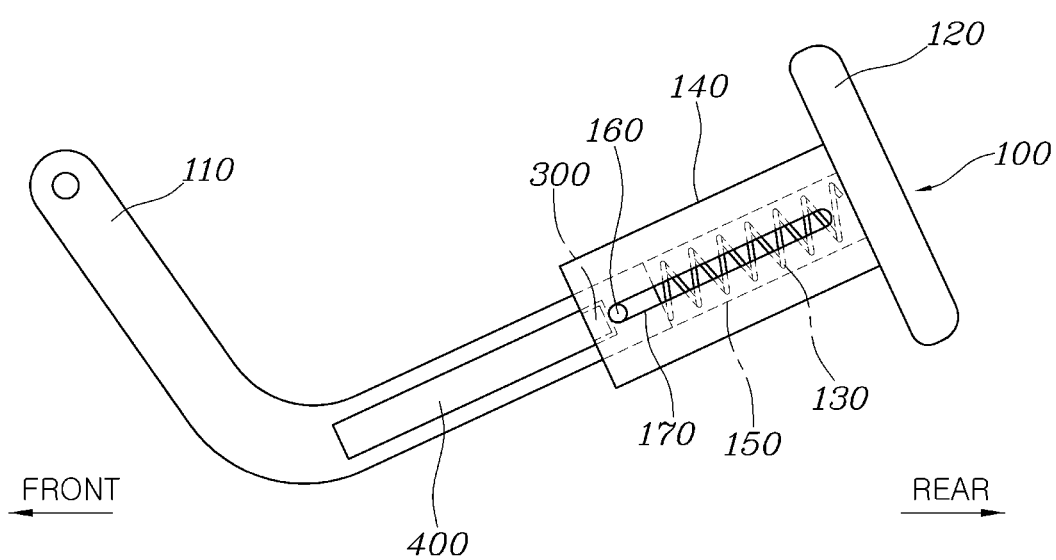
FIG. 5 is a view of the foldable pedal apparatus according to the present disclosure shown in FIG. 3 in the state in which a footrest panel is removed.
Figure 6:
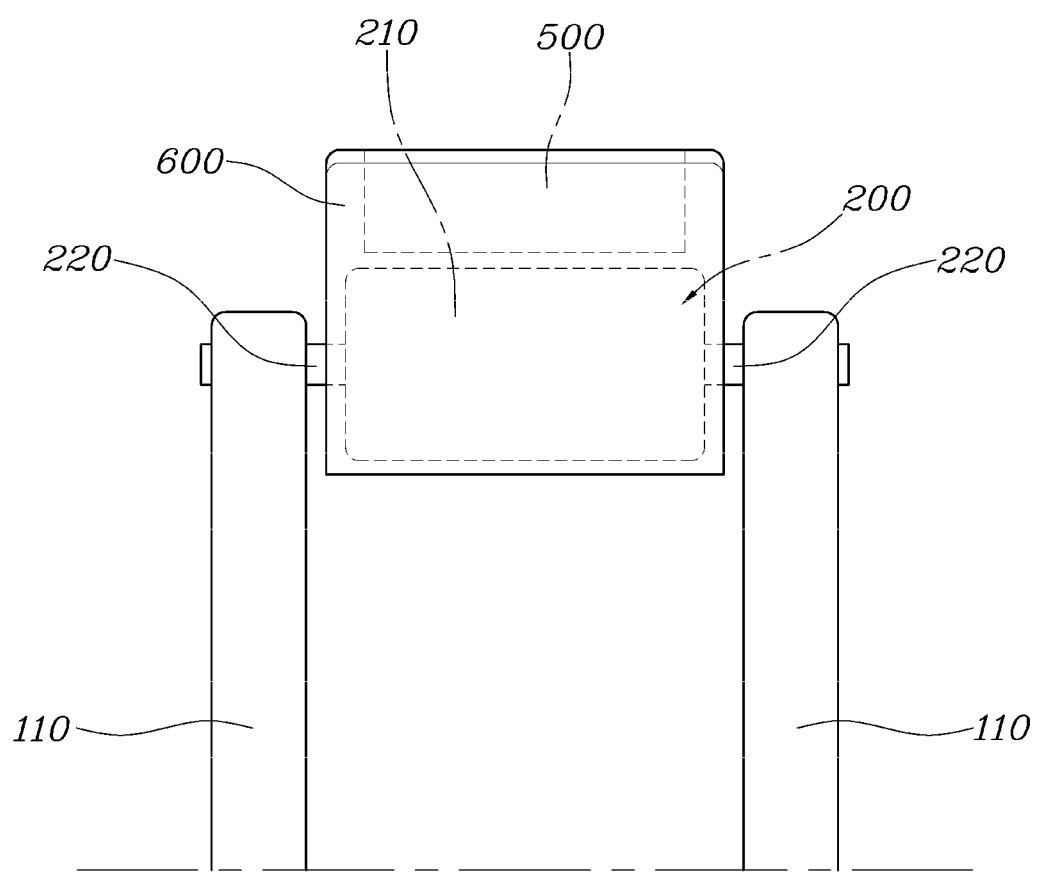
FIG. 6 is a view illustrating a portion of the foldable pedal apparatus for vehicles according to the present disclosure, with which an actuator is combined.
Figure 9:
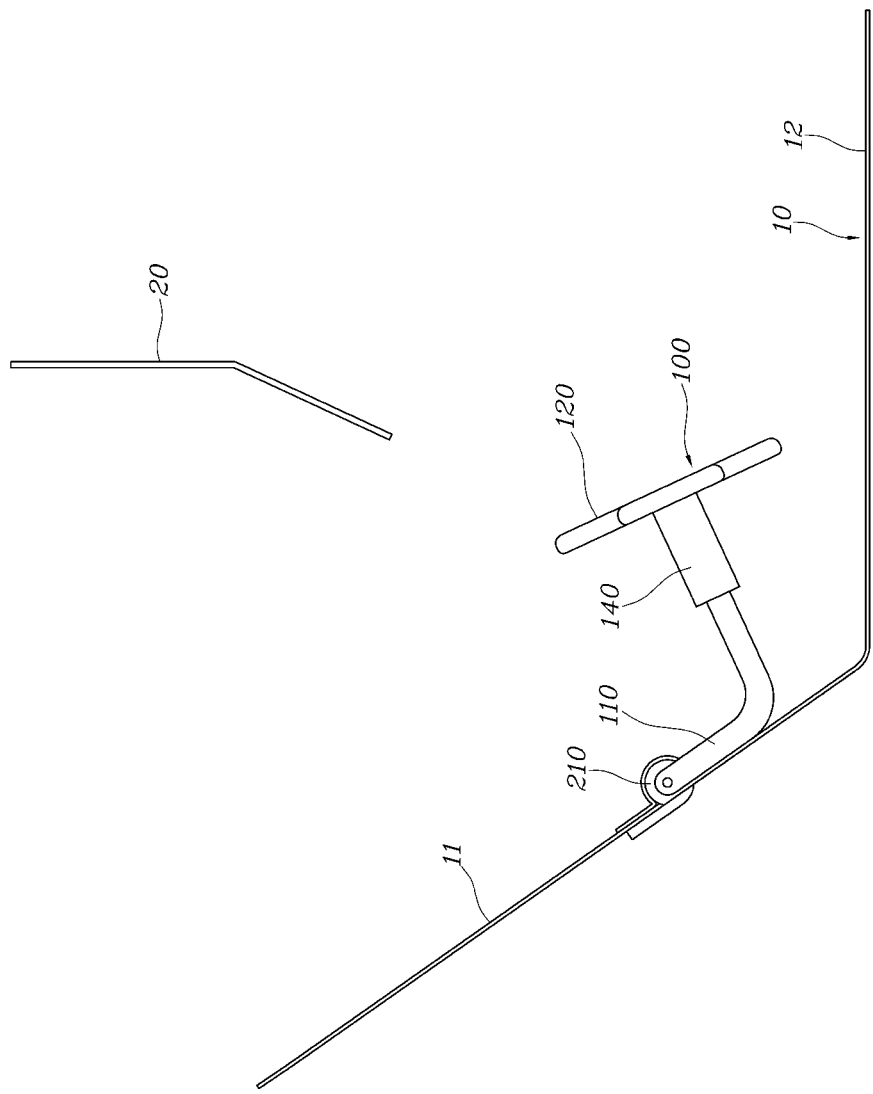
FIG. 9 is a view of the foldable pedal apparatus according to the present disclosure in the pop-up state of the pedal assemblies.

On the other hand, in the foldable pedal apparatus for a vehicle according to the present disclosure, when the pedal assemblies 100 are rotated rearwards and thus protrude towards the interior of the vehicle, the pedal assemblies 100 are exposed to the driver and thus enter the pop-up state in which the pedal assemblies 100 are manipulable by the driver (with reference to FIGS. 2, 3 and 9).

When the pedal assemblies 100 in the hidden state are rotated rearwards and are thus converted into the pop-up state, the pedal assemblies 100 protrude through a passage formed under the center fascia under cover 20 and are exposed to the driver.

Therefore, when the pedal assemblies 100 are popped up, the pedal assemblies 100 located in the hidden space between the front surface 11 of the footrest panel 10 and the center fascia under cover 20 protrude through the passage formed under the center fascia under cover 20 while being popped up, and thereby, the high-tech image of the foldable pedal apparatus for a vehicle may be maximized.

The foldable pedal apparatus for a vehicle according to the present disclosure includes two pedal devices having the same configuration, i.e., each of which includes the pedal assembly 100 and the actuator 200, the two pedal devices are installed on the footrest panel 10 so as to be laterally spaced apart from each other.

Among the two pedal assemblies 100 of the two pedal devices installed on the footrest panel 10 so as to be laterally spaced apart from each other, one pedal assembly 100 is used as a pedal assembly 101 of an accelerator pedal device, and a remaining pedal assembly 100 is used as a pedal assembly 102 of a brake pedal device.

In one embodiment of the present disclosure, the pedal assembly 100 located on the right side of the footrest panel 10 may be used as the pedal assembly 101 of the accelerator pedal device, and the pedal assembly 100 located on the left side of the footrest panel 10 may be used as the pedal assembly 102 of the brake pedal device.

Further, the actuators 200 include an actuator 201 of the accelerator pedal device configured to rotate the pedal assembly 101 of the accelerator pedal device, and an actuator 202 of the brake pedal device configured to rotate the pedal assembly 102 of the brake pedal device.

Each of the pedal assemblies 100 according to the present disclosure includes pedal arms 110 connected to a corresponding one of the actuators 200 and rotated during operation of the corresponding one of the actuators 200, a pedal pad 120 combined with the pedal arms 110 and rectilinearly moved in the length direction of the pedal arms 110 when external force is applied thereto, and return springs 130 installed with both ends supported by the pedal arms 110 and the pedal pad 120 so as to provide returning force to the pedal pad 120.

The pedal arms 110 include two pedal arms 110 laterally spaced apart from each other, thereby being capable of securing robustness and operation safety.

Two connectors 140 combined with the two pedal arms 110 are provided on the pedal pad 120, connector holes 150 configured to extend in the length direction and to be open towards the pedal arms 110 are formed in the connectors 140, and each of the return springs 130 and one end of each of the pedal arms 110 are inserted into a corresponding one of the connector holes 150.

The connectors 140 serve to guide rectilinear movement of the pedal pad 120.

When the pedal pad 120 is rectilinearly moved forwards by the driver, the return springs 130 are compressed and thus accumulate elastic force, and when force applied to the pedal pad 120 by the driver is released, the return springs 130 are uncompressed and thus return to their original state, and then, the pedal pad 120 returns to the initial position thereof due to the elastic force from the return springs 130.

The return springs 130 may be coiled springs, and the pedal effort of the pedal pad 120 may be tuned by tuning the spring force of the return springs 130.

According to the present disclosure, a pedal arm pin 160 configured to protrude outwards is provided at the rear end of each of the pedal arms 110, and a slot hole 170 configured to extend in the length direction of the connectors 140 is formed in each of the connectors 140 so that the pedal arm pin 160 is inserted into the slot hole 170.

The pedal arm pins 160 and the slot holes 170 serve to guide rectilinear movement of the pedal pad 120, to prevent release of the pedal pad 120, and to regulate the stroke of the pedal pad 120.

The pedal arms 110 according to the present disclosure are formed in an L shape so that the front straight sections of the pedal arms 110 come into surface contact with the front surface 11 of the footrest panel 10 when the pedal assembles 100 are rotated rearwards and are thus in the pop-up state, as show in FIG. 3, and may thereby sufficiently secure supporting force when the pedal pad 120 is operated by the driver.

As described above, one of the two pedal assemblies 100 is used as the pedal assembly 101 of the accelerator pedal device and a remaining one is used as the pedal assembly 102 of the brake pedal device, and in this case, the pedal pad 120 of the pedal assembly 101 of the accelerator pedal device has a greater size in the vertical direction than that of the pedal pad 120 of the pedal assembly 102 of the brake pedal device and the pedal pad 120 of the pedal assembly 102 of the brake pedal device has a greater size in the lateral direction than that of the pedal pad 120 of the pedal assembly 101 of the accelerator pedal device.

The reason why the pedal pad 120 for the accelerator pedal device and the pedal pad 120 for the brake pedal device have different sizes is to secure ease in operation of the pedal assemblies 101 and 102 by the driver and to prevent erroneous operation through shape differentiation depending on the kind of the pedal pads 120.

The foldable pedal apparatus for a vehicle according to one embodiment of the present disclosure further includes permanent magnets 300 combined with the ends of the connectors 140 and pedal sensors 400 combined with the pedal arms 110 so as to face the permanent magnets 300, and each of the pedal sensors 400 detects a stroke change of a corresponding one of the pedal pads 120 through a magnetic flux change depending on a position change of a corresponding one of the permanent magnets 300 when the corresponding one of the pedal pads 120 is rectilinearly moved.

The permanent magnet 300 and the pedal sensor 400 may be provided at only one of the two pedal arms 110 and only one of the two connectors 140 of each of the pedal assemblies 100, or may be respectively provided at both of the two pedal arms 110 and both of the two connectors 140 of each of the pedal assemblies 100.

When the permanent magnet 300 and the pedal sensor 400 are provided at one of the two pedal arms 110 and one of the two connectors 140 of each of the pedal assemblies 100, cost reduction may be achieved, and when the permanent magnet 300 and the pedal sensor 400 are provided at both of the two pedal arms 110 and both of the two connectors 140 of each of the pedal assemblies 100, safety in operation may be more robustly secured.

The actuators 200 according to the present disclosure are rotating motors 210 fixedly installed on the front surface 11 of the footrest panel 10, and the rotating motors 210 are dual shaft-type motors configured to be rotatable in both the clockwise direction and the counterclockwise direction and provided with at a motor shaft 220 protruding from both sides of each of the dual shaft-type motors.

The reason why the dual shaft-type motors are used as the rotating motors 210 is to simultaneously rotate the two pedal arms 110, and the motor shaft 220 protruding from both sides of each of the rotating motors 210 are combined with the front ends of the two pedal arms 110 so that the two pedal arms 110 are simultaneously rotated in the same direction when a corresponding one of the rotating motors 210 is operated.

The foldable pedal apparatus for a vehicle according to one embodiment of the present disclosure further includes printed circuit boards (PCBs) 500 fixed to the footrest panel 10, and each of the PCBs 500 controls driving of a corresponding one of the rotating motors 210, receives a signal from a corresponding one of the pedal sensors 400 and generates a signal related to pedal functions, and the signal related to the pedal functions is a signal related to braking of the vehicle or a signal related to acceleration of the vehicle.

The PCBs 500 and the rotating motors 210 are electrically connected and the PCBs 500 and the pedal sensors 400 are electrically connected so as to transceive signals, and the rotating motors 210 are electrically connected to a power supply so as to be operated.

Only when a position of one of the permanent magnets 300 is changed due to forward movement of a corresponding one of the pedal pads 120 by driver operation in the situation in which the rotating motors 210 are not operated in the pop-up state, in which the pedal pads 120 are exposed to the driver due to rearward movement of the pedal arms 110 by operating the rotating motors 210, a corresponding one of the PCBs 500 generates the signal related to the pedal functions.

The foldable pedal apparatus for a vehicle according to one embodiment of the present disclosure further includes protective covers 600 fixed to the footrest panel 10 and configured to cover the rotating motors 210 and the PCBs 500 so as to protect the rotating motors 210 and the PCBs 500.

The protective covers 600 may be formed of a robust material so as to prevent damage to the rotating motors 210 and the PCBs 500, and for example, may be formed of steel or plastic.

Panel recesses 13 configured to protrude forwards and to be open rearwards are formed on the front surface 11 of the footrest panel 10, the rotating motors 210 and the PCBs 500 are installed to be inserted into the panel recesses 13, and the protective covers 600 are installed at the interior side of the vehicle so as to shield the panel recesses 13 while covering the rotating motors 210 and the PCBs 500.

In one embodiment of the present disclosure, no holes connected to the engine compartment are formed in the footrest panel 10 in order to install and operate the foldable pedal apparatus, and inflow of noise and foreign substances and penetration of moisture into the interior of the vehicle may be prevented.

Further, the pedal assembly 100 according to the present disclosure is configured such that the pedal arms 110 and the pedal pad 120 are spaced upwards from the bottom surface 12 of the footrest panel 10 so as to float in the air, thereby being capable of preventing foreign substances located on the bottom surface 12 of the footrest panel 10 from interfering with the pedal assembly 100 and consequently further improving safety in operation.

FIGS. 7 and 8 illustrate a state in which the pedal assemblies 100 including the pedal arms 110 and the pedal pads 120 are rotated forwards and upwards so as to be located maximally close to the front surface 11 of the footrest panel 10 by operating the rotating motors 210, and in this case, exposure of the pedal assemblies 100 towards the driver is interrupted and thus the pedal assemblies 100 enter the hidden state in which the pedal assemblies 100 are nonmanipulable by the driver.

When the pedal assemblies 100 are in the hidden state, the pedal assemblies 100 are shielded by the center fascia under cover 20 and are thus not exposed to driver's or passenger's view inside the vehicle, and thereby, the interior design of the vehicle may be improved.

Further, because the pedal assemblies 100 are located in the space between the front surface 11 of the footrest panel 10 and the center fascia under cover 20 in the hidden state of the pedal assemblies 100, the space configured to hide the pedal assemblies 100 in the hidden state thereof may be minimized, and thereby, the space of the interior of the vehicle and the space of the engine compartment may be assured.

In addition, when the pedal assemblies 100 are in the hidden (shielded) state, a space under the driver's seat may be widened without interference with the pedals and thus allow the driver to comfortably rest in a relaxation mode, and erroneous operation of the pedals may be prevented so as to facilitate safety improvement.

FIGS. 2, 3 and 9 illustrate a state in which the pedal assemblies 100 including the pedal arms 110 and the pedal pads 120 in the above-described hidden state are rotated rearwards so as to protrude towards the interior of the vehicle, and in this case, the pedal assemblies 100 are exposed to the driver and thus enter the pop-up state in which the pedal assemblies 100 are manipulable by the driver.

When the pedal assemblies 100 in the hidden state are rotated rearwards and are thus converted into the pop-up state, the pedal assemblies 100 protrude through the passage formed under the center fascia under cover 20 and are exposed to the driver.

Therefore, when the pedal assemblies 100 are popped up, the pedal assemblies 100 located in the hidden space between the front surface 11 of the footrest panel 10 and the center fascia under cover 20 protrude through the passage formed under the center fascia under cover 20 while being popped up, and thereby, the high-tech image of the foldable pedal apparatus for a vehicle may be maximized.

Figure 10:
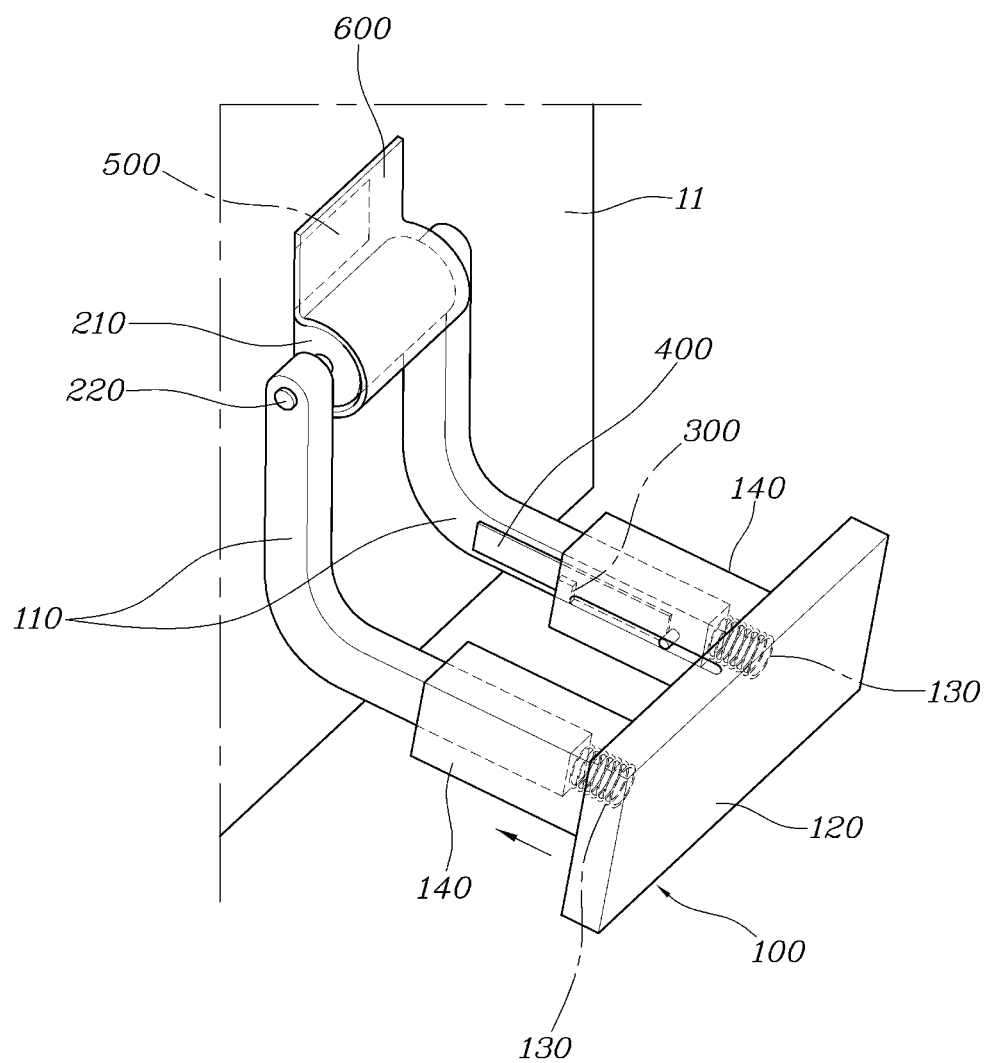
FIGS. 10 and 11 are views illustrating a state in which a pop-up pedal pad is normally moved forwards by driver operation and is thus normally operated.
Figure 11:
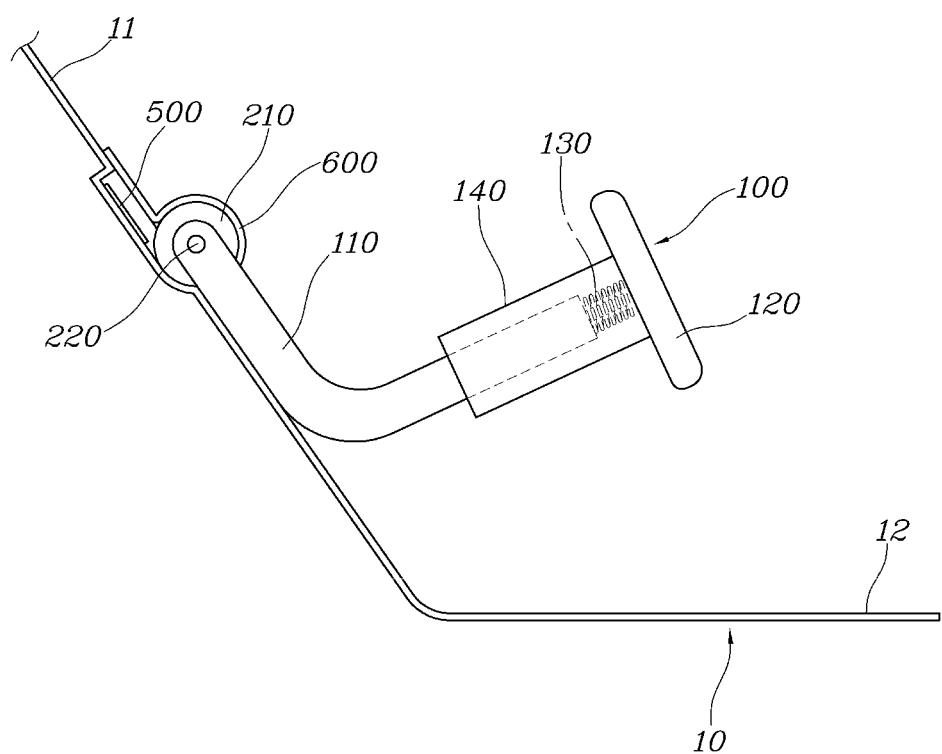

FIGS. 10 and 11 are views illustrating the state in which the pedal pad 120 of the pop-up pedal assembly 100 is normally moved forwards by driver operation of the pedal pad 120.

As described above, when the pedal pads 120 are in the pop-up state, the driver may normally operate one of the protruding pedal pads 120 by depressing the pedal pad 120.

When the pedal pad 120 is normally operated, the pedal effort of the pedal pad 120 may be achieved through the return springs 130, and movement of the pedal arms 110 may be constrained due to constraining force of the rotating motor 210 and contact between the pedal arms 110 and the front surface 11 of the footrest panel 10.

When the pedal pad 120 is moved forwards by operation of the driver, the corresponding permanent magnet 300 is moved together with the pedal pad 120, and the pedal sensor 400 detects a stroke change of the pedal pad 120 through a magnetic flux change depending on a position change of the permanent magnet 300 when the permanent magnet 300 is moved.

A signal from the pedal sensor 400 is transmitted to the PCB 500, and the PCB 500 receives the signal from the pedal sensor 400 and generates a signal related to the pedal functions (a signal related to braking of the vehicle or a signal related to acceleration of the vehicle).

In one embodiment of the present disclosure, only when the position of one of the permanent magnets 300 is changed due to forward movement of a corresponding one of the pedal pads 120 by driver operation in a situation in which the rotating motors 210 are not operated in the pop-up state, in which the pedal pads 120 are exposed to the driver due to rearward movement of the pedal arms 110 by operating the rotating motors 210, a corresponding one of the PCBs 500 generates the signal related to the pedal functions, thereby being capable of facilitating more stable operation of the foldable pedal apparatus.

As described above, in the foldable pedal apparatus for a vehicle according to the present disclosure, the pedal assemblies 100 including the pedal arms 110 and the pedal pads 120 are rotated rearwards and are thus popped up to the driver so as to be operated by the driver in the manual driving mode in which the driver directly drives a vehicle, and the pedal assemblies 100 including the pedal arms 110 and the pedal pads 120 are rotated forwards and upwards, are located maximally close to the front surface 11 of the footrest panel 10 and thus enters the hidden state in which exposure of the pedal assemblies 100 to the driver is interrupted so as not to be operated by the driver in an autonomous driving situation, thereby enabling the driver to comfortably rest in the autonomous driving situation and promoting safety improvement through interruption of erroneous operation of pedals in the autonomous driving situation.

Further, in the foldable pedal apparatus for a vehicle according to the present disclosure, the pedal assemblies 100 are shielded by the center fascia under cover 20 and are thus not exposed to driver's or passenger's view inside the vehicle in the hidden state of the pedal assemblies 100, and thereby, the interior design of the vehicle may be improved.

Moreover, because the pedal assemblies 100 are located in the space between the front surface 11 of the footrest panel 10 and the center fascia under cover 20 in the hidden state, the space configured to hide the pedal assemblies 100 in the hidden state thereof may be minimized, and thereby, the space of the interior of the vehicle and the space of the engine compartment may be assured.

In addition, when the pedal assemblies 100 in the hidden state are rotated rearwards and are thus converted into the pop-up state, the pedal assemblies 100 protrude through the passage formed under the center fascia under cover 20 and are exposed to the driver, and thereby, the high-tech image of the foldable pedal apparatus for a vehicle may be maximized.

Further, no holes connected to the engine compartment are formed in the footrest panel 10 in order to install and operate the foldable pedal apparatus for a vehicle according to the present disclosure, and thereby, inflow of noise and foreign substances and penetration of moisture into the interior of the vehicle may be prevented.

As is apparent from the above description, in a foldable pedal apparatus for a vehicle according to the present disclosure, pedal assemblies including pedal arms and pedal pads are rotated rearwards and are thus popped up to a driver so as to be operated by the driver in a manual driving mode in which the driver directly drives a vehicle, and the pedal assemblies including the pedal arms and the pedal pads are rotated forwards and upwards, are located maximally close to the front surface of a footrest panel and thus enters a hidden state in which exposure of the pedal assemblies to the driver is interrupted so as not to be operated by the driver in an autonomous driving situation, thereby enabling the driver to comfortably rest in the autonomous driving situation and promoting safety improvement through interruption of erroneous operation of pedals in the autonomous driving situation.

Further, in the foldable pedal apparatus for a vehicle according to the present disclosure, the pedal assemblies are shielded by a center fascia under cover and are thus not exposed to driver's or passenger's view inside the vehicle in the hidden state of the pedal assemblies 100, and thereby, the interior design of the vehicle may be improved.

Moreover, because the pedal assemblies are located in a space between the front surface of the footrest panel and the center fascia under cover in the hidden state, a space configured to hide the pedal assemblies in the hidden state thereof may be minimized, and thereby, the space of the interior of the vehicle and the space of the engine compartment may be assured.

In addition, when the pedal assemblies in the hidden state are rotated rearwards and are thus converted into the pop-up state, the pedal assemblies protrude through a passage formed under the center fascia under cover and are exposed to the driver, and thereby, the high-tech image of the foldable pedal apparatus for a vehicle may be maximized.

Further, no holes connected to an engine compartment are formed in the footrest panel in order to install and operate the foldable pedal apparatus for a vehicle according to the present disclosure, and thereby, inflow of noise and foreign substances and penetration of moisture into the interior of the vehicle may be prevented.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A foldable pedal apparatus for a vehicle, comprising:
    pedal assemblies configured to be rotated toward a front surface of a footrest panel to enter a hidden state, in which the pedal assemblies are nonmanipulable by a driver, in an autonomous driving situation, and configured to be rotated rearwards to enter a pop-up state, in which the pedal assemblies are exposed to the driver so as to be manipulable by the driver, in a manual driving mode; and
    actuators fixed to the footrest panel, respectively connected to the pedal assemblies and operated to rotate the pedal assemblies forwards and upwards, or rearwards;
    wherein each of the pedal assemblies comprises:
        pedal arms connected to a corresponding one of the actuators and rotated during operation of the corresponding one of the actuators;
        a pedal pad combined with the pedal arms and rectilinearly moved in a length direction of the pedal arms when external force is applied thereto; and
        return springs installed with opposed ends supported by the pedal arms and the pedal pad so as to provide returning force to the pedal pad.

2. The foldable pedal apparatus according to claim 1, further comprising two pedal devices, each pedal device comprising one of the pedal assemblies and one of the actuators, wherein the two pedal devices are installed on the footrest panel so as to be laterally spaced apart from each other.

3. The foldable pedal apparatus according to claim 2, wherein one of the two pedal devices installed on the footrest panel so as to be laterally spaced apart from each other is used as an accelerator pedal device, and a remaining one of the two pedal devices is used as a brake pedal device.

4. The foldable pedal apparatus according to claim 1, wherein for each of the pedal assemblies:
the pedal arms comprise two pedal arms laterally spaced apart from each other;
two connectors respectively combined with the two pedal arms are provided on the pedal pad;
connector holes configured to extend in the length direction are formed in the connectors; and
each of the return springs and one end of each of the pedal arms are inserted into a corresponding one of the connector holes.

5. The foldable pedal apparatus according to claim 4, wherein for each of the pedal assemblies:
a pedal arm pin configured to protrude outwards is provided at a rear end of each of the pedal arms; and
a slot hole configured to extend in the length direction of the connectors is formed in each of the connectors so that the pedal arm pin is inserted into the slot hole.

6. The foldable pedal apparatus according to claim 4, further comprising:
permanent magnets combined with ends of the connectors; and
pedal sensors combined with the pedal arms so as to face the permanent magnets,
wherein each of the pedal sensors detects a stroke change of a corresponding one of the pedal pads through a magnetic flux change depending on a position change of a corresponding one of the permanent magnets when the corresponding one of the pedal pads is rectilinearly moved.

7. The foldable pedal apparatus according to claim 6, wherein each of the permanent magnets and each of the pedal sensors are provided at one of the two pedal arms and one of the two connectors of each of the pedal assemblies, or are respectively provided at both of the two pedal arms and both of the two connectors of each of the pedal assemblies.

8. The foldable pedal apparatus according to claim 6, wherein the actuators are rotating motors fixedly installed on the front surface of the footrest panel, and
wherein the rotating motors are dual shaft motors configured to be rotatable in both a clockwise direction and a counterclockwise direction and provided with a motor shaft configured to protrude from opposed sides of each of the dual shaft motors.

9. The foldable pedal apparatus according to claim 8, wherein the motor shaft configured to protrude from the opposed sides of each of the rotating motors is combined with front ends of the two pedal arms so that the two pedal arms are simultaneously rotated in the same direction when a corresponding one of the rotating motors is operated.

10. The foldable pedal apparatus according to claim 8, further comprising:
printed circuit boards (PCBs) fixed to the footrest panel,
wherein each of the PCBs controls driving of a corresponding one of the rotating motors, receives a signal from a corresponding one of the pedal sensors, and generates a signal related to pedal functions.

11. The foldable pedal apparatus according to claim 10, wherein, when a position of one of the permanent magnets is changed due to forward movement of a corresponding one of the pedal pads by driver operation in a situation in which the rotating motors are not operated in the pop-up state, in which the pedal pads are exposed to the driver due to rearward movement of the pedal arms by operating the rotating motors, a corresponding one of the PCBs generates the signal related to the pedal functions.

12. The foldable pedal apparatus according to claim 10, further comprising protective covers fixed to the footrest panel and configured to cover the rotating motors and the PCBs so as to protect the rotating motors and the PCBs.

13. The foldable pedal apparatus according to claim 12, wherein:
panel recesses configured to protrude forwards and to be open rearwards are formed on the front surface of the footrest panel;
the rotating motors and the PCBs are installed to be inserted into the panel recesses; and
the protective covers are installed at an interior side of a vehicle so as to shield the panel recesses while covering the rotating motors and the PCBs.

14. The foldable pedal apparatus according to claim 1, wherein the pedal arms are formed in an L shape so that a supported state of the pedal arms through surface contact between the pedal arms and the front surface of the footrest panel is maintained when the pedal assemblies are rotated rearwards and are thus in the pop-up state.

15. The foldable pedal apparatus according to claim 1, wherein:
the pedal pads comprise a pedal pad of a pedal assembly of an accelerator pedal device and a pedal pad of a pedal assembly of a brake pedal device;
the pedal pad of the pedal assembly of the accelerator pedal device has a greater size in a vertical direction than a size in the vertical direction of the pedal pad of the pedal assembly of the brake pedal device; and
the pedal pad of the pedal assembly of the brake pedal device has a greater size in a lateral direction than a size in the lateral direction of the pedal pad of the pedal assembly of the accelerator pedal device.

16. The foldable pedal apparatus according to claim 1, wherein, when the pedal assemblies are in the hidden state, the pedal assemblies are shielded by a center fascia under cover so as not to be exposed to the driver.

17. The foldable pedal apparatus according to claim 16, wherein, when the pedal assemblies in the hidden state are rotated rearwards and are thus converted into the pop-up state, the pedal assemblies protrude through a passage formed under the center fascia under cover so as to be exposed to the driver.

* * * * *